(12) United States Patent
Usui

(10) Patent No.: US 6,237,013 B1
(45) Date of Patent: May 22, 2001

(54) METHOD AND DEVICE FOR CORRELATING DETECTION, AND COMMUNICATION TERMINAL DEVICE

(75) Inventor: Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/212,905

(22) Filed: Dec. 16, 1998

(30) Foreign Application Priority Data

Dec. 18, 1997 (JP) .................................................. 9-349606

(51) Int. Cl.$^7$ ....................................................... G06F 17/15
(52) U.S. Cl. ............................................................ 708/422
(58) Field of Search ................................. 708/422–425; 375/142–143, 150, 152

(56) References Cited

U.S. PATENT DOCUMENTS 5,953,365 * 9/1999 Badke .................................... 375/152
6,111,868 * 8/2000 Lee et al. .............................. 375/152

* cited by examiner

*Primary Examiner*—Tan V. Mai
(74) *Attorney, Agent, or Firm*—Jay H. Maioli

(57) ABSTRACT

A correlation detection device capable of detecting a prescribed code sequence from an input signal with a simple construction. Since the input signal (S40), after its amplitude is regulated to a fixed value, is entered into a matched filter (71), an accidental output by the matched filter of the correlation value having a large signal level can be prevented, and only the code sequence to be detected can be correctly detected.

10 Claims, 14 Drawing Sheets

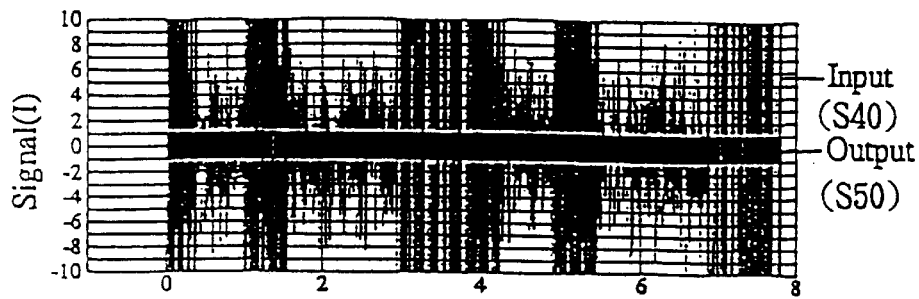
FIG. 11A
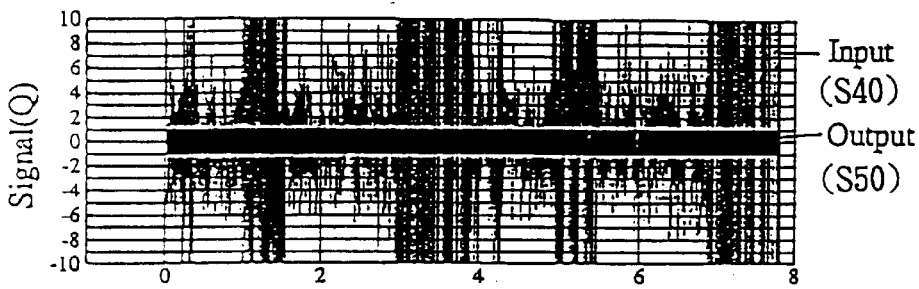
FIG. 11B
FIG. 11C
FIG. 11D
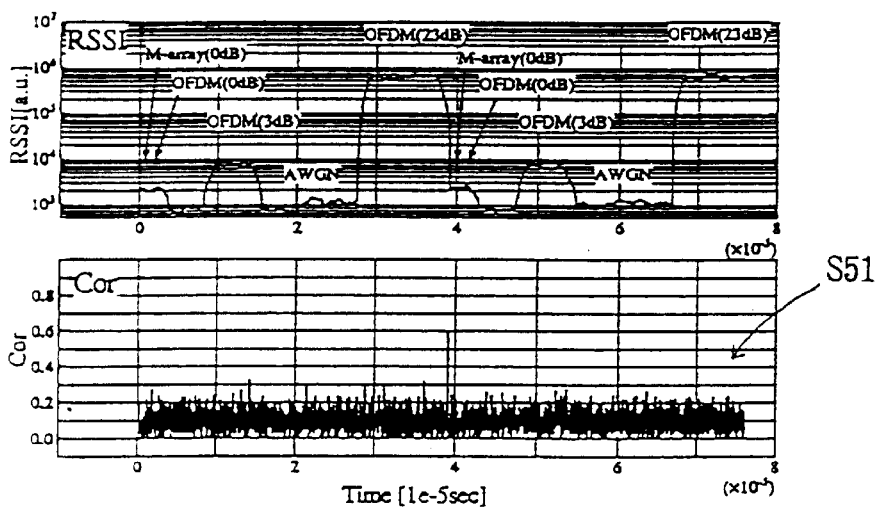
FIG. 11E
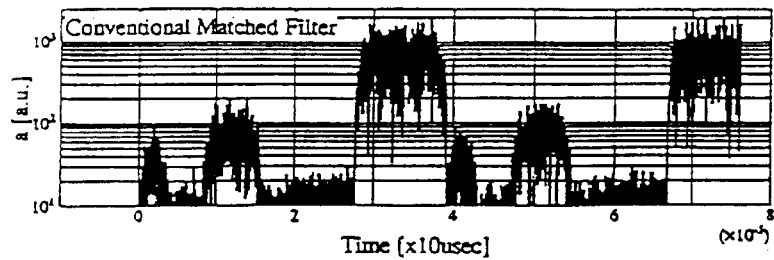

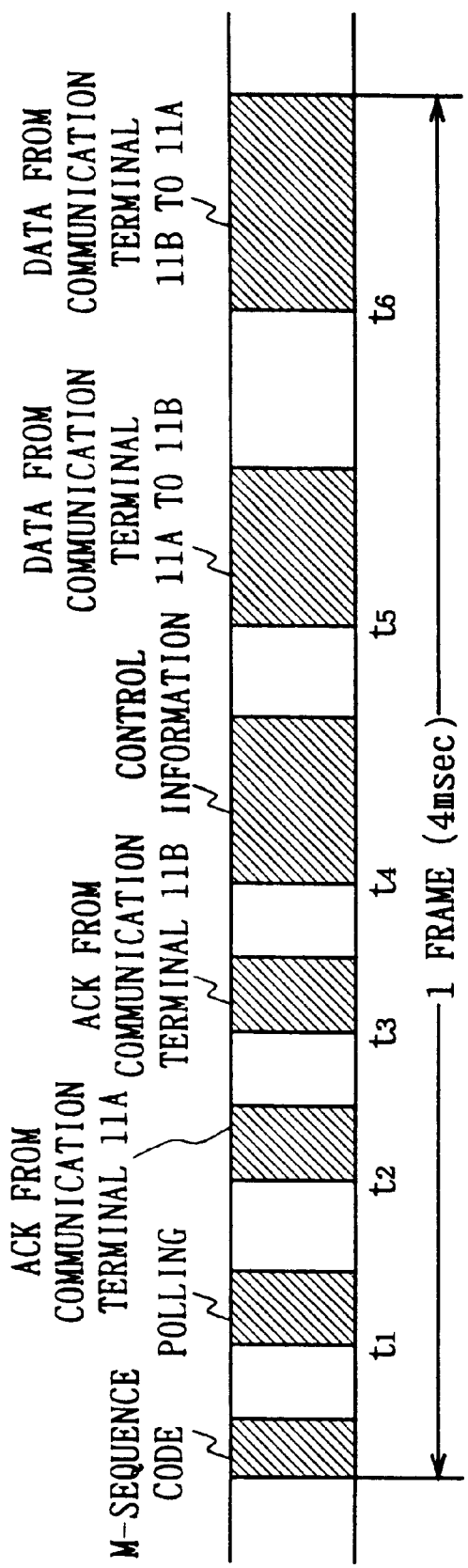
F I G. 14

METHOD AND DEVICE FOR CORRELATING DETECTION, AND COMMUNICATION TERMINAL DEVICE

BACKGROUND OF THE INVENTION

1. Field of the Invention

The present invention relates to a correlation detection device, its method and a communication terminal device for detecting special codes contained in an input signal and is suitably applied to the case of setting the timing using special codes especially in the wireless LAN to connect in a wireless fashion the plural number of terminal devices.

2. Description of the Related Art

In recent years, with the development of high technology in computers, LAN (local area network) has been formed by connecting multiple computers and files and data are used in common and electronic mails and data are transmitted extensively. In the conventional LAN, computers are connected via cables such as using optical fiber, coaxial cable, or twisted pair cable each other.

However, in the wired LAN, it is very difficult to install the LAN since the installation work is necessary in order to connect these an such wired LAN requires very complicated cabling. Thus, the wireless LAN has become a focus of attention to solve the wiring problem of the conventional LAN cable system.

As the wireless LAN, the system that performs data communications according to CDMA (code division multiple access) system using spread spectrum has been proposed. In this CDMA system, the transmission data is multiplied by the PN code (pseudo noise code) and spectrum of the transmission data will be spread. The data transmitted upon being spectrum spread is demodulated multiplying by the same PN code as the transmitting end. This CDMA system has an excellent interference resistivity as well as having adequate security.

In recent years, with the dissemination of information through multimedia, data large in size such as video and audio have been widely handled. Accordingly, it is required to increase the transmission rate in order that a large volume of data such as video and audio can be transmitted in the wireless LAN. However, in the spread spectrum modulation, if the data is transmitted at a high velocity rate such as approximately 30 [Mbps], the bandwidth more than 300 [MHz] becomes necessary. Such broad band cannot be secured according to the present frequency allocation, and also it is very difficult to communicate using such broad band.

Moreover, in the spread spectrum synchronization recovery time for matching the phase of data code transmitted and the phase of code to be generated at the receiver for demodulation is necessary when demodulating. Accordingly, in the spread spectrum, a sequence of bits for synchronization is inserted into each packet in order to get synchronization at high speed, and due to such bits sequence for synchronization, it causes a problem that bits other than effective data would be increased.

Hence, the application of this patent proposes that data will be transmitted by the OFDM (orthogonal frequency division multiplexing) scheme, as well as the data communications will be conducted by the TDMA (time division multiple access) scheme making one frame as a unit, and M-sequence code will be transmitted at the head of one frame, the transmit/receive timing will be set relative to this M-sequence code, and the transmit/receive timing of each communication terminal device will be specified by the control information from the communication control terminal device. Since in this OFDM scheme, data will be transmitted in parallel utilizing the plural number of sub-carriers orthogonally arranged, transmission rate can be increased easily and if jitter occurs, it can be demodulated without error. Also, at the time when receiving, since transmit/receive timing is set relative to the M-sequence code on the head of one frame, data can be reproduced by demodulating only the necessary symbol in the frame using this time information.

Accordingly, in the case of receiving the M-sequence code and setting the timing, it is necessary to detect the M-sequence code from the receiving signal. As the circuit for detecting such M-sequence code, utilization of a correlation detection circuit using matched filter can be considered.

At this point, the correlation detection circuit having a matched filter will be described referring to FIG. 1. As shown in FIG. 1, a receive signal S1 is entered into a matched filter 2 via an input terminal IN in the correlation detection circuit 1. The matched filter 2 is made up of digital filter such as FIR filter, and as shown in FIG. 2, it is comprised of delay circuits $D_1$–$D_n$, multipliers $K_1$–$K_n$ and an adder $A_1$. The coefficient, that multipliers $K_1$–$K_n$ multiply, will be set to "1" or "–1" according to the code to be detected. And if the correlation between the code set to the coefficient of multipliers $K_1$–$K_n$ and the input code received is strong, the output level of the adder $A_1$ becomes large.

Then, the matched filter 2 transmits an output signal of this adder $A_1$ to a comparator 3 of the succeeding stage as a correlation value signal S2. The comparator 3 compares the signal level of the correlation value signal S2 to be transmitted from the matched filter 2 and the signal level of the threshold signal TH to be supplied from the outside, and if the signal level of the correlation value signal S2 is larger than the threshold signal TH, the comparator 3 outputs a detection output S3 showing that the signal having correlation has been received via an output terminal OUT.

In the case where the M-sequence code is supplied as the receive signal S1, output of the matched filter becomes large and since the signal level of the correlation value signal S2 becomes larger than the threshold signal TH, the detection output S3 showing that the M-sequence code has been received is sent out from the correlation detection circuit 1.

However, in the correlation detection circuit 1 constructed as described above, there are cases where detection output S3 would not be sent out even when the M-sequence code is received but if the signal level of the signal other than the M-sequence code received immediately before is large.

In general, at the preceding stage of the correlation detection circuit 1, AGC (automatic gain control) circuit is provided and this adjusts the receive signal S1 to the prescribed power. As described above, there are cases where the detection output S3 would not be output because of this AGC circuit even when the M-sequence code is received. For example, as shown in FIG. 3A, the M-sequence code is simply imbedded in the other signal even if the AGC circuit functions, uniform power adjustments will be conducted. And thus the correlation value signal S2, that is the output of the matched filter 2, increases when the M-sequence code is received. And as a result, the detection output S3 showing that the M-sequence code is received normally can be sent out by the correlation value signal S2 exceeding the threshold TH.

However, as shown in FIG. 3B, when the other receive signal received immediately before the M-sequence code is large, the processing to decrease the gain is conducted by the AGC circuit. However, since the recovery time is required for the AGC circuit to increase the gain, there are cases where the low gain state continues for some time even when the M-sequence code is received. Accordingly, the receive signal of the M-sequence code will not be amplified and as a result, the output of the matched filter, the correlation value signal S2, will not exceed the threshold TH, and there are cases where the detection signal S3 would not be transmitted even though the M-sequence code has been received.

Furthermore, if the receive signal other than the M-sequence code received immediately before is extremely large, there is a possibility that the correlation value signal S2, which is the output of the matched filter 2, outputs the detection output S3 exceeding the threshold TH by mistake even though the M-sequence code has not been received.

SUMMARY OF THE INVENTION

In view of the foregoing, an object of this invention is to provide a correlation detection device and its method capable of detecting the prescribed code sequence from input signal correctly with a signal construction.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 11A to 11E are characteristic curvilinear diagrams showing characteristics of the correlation detection circuit;

FIG. 14 is a brief linear diagram illustrating the data construction within one frame;

DETAILED DESCRIPTION OF THE EMBODIMENT

Preferred embodiments of the present invention will be described with reference to the accompanying drawings:

(1) The First Embodiment
(1-1) General Construction of Wireless LAN System

Figure 4:
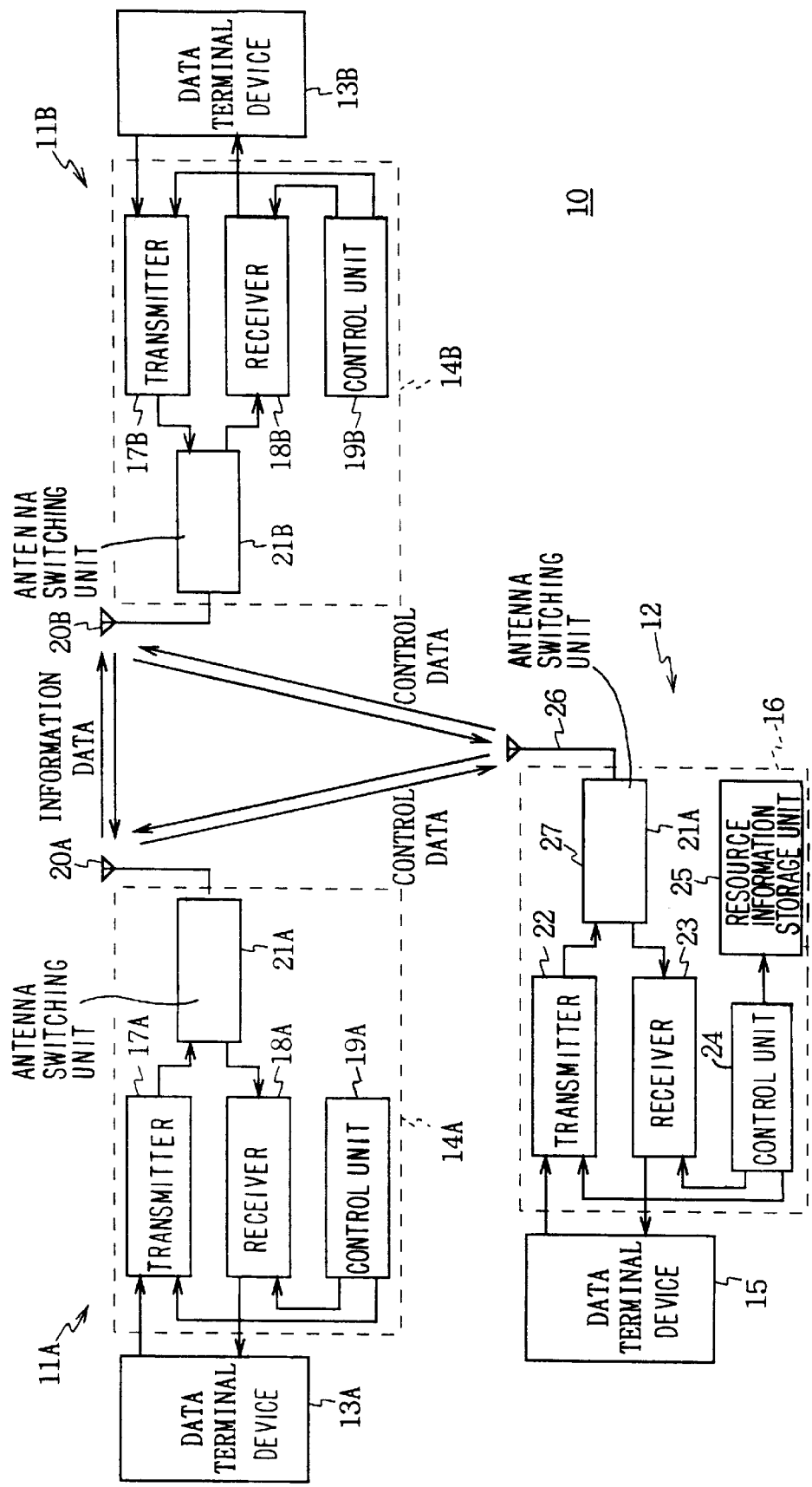
FIG. 4 is a block diagram showing the construction of a wireless LAN system according to the present invention.

In FIG. 4, 10 generally shows a wireless LAN system according to the present invention. This wireless LAN is roughly comprised of multiple communication terminal devices 11A, 11B and a communication control terminal device 12. The communication terminal devices 11A and 11B are comprised of data terminal devices 13A and 13B connected with wireless communication units 14A and 14B respectively. The communication control device 12 is comprised of a wireless communication unit 16 connected with a data terminal device 15. In this wireless LAN system 10, data communication is conducted between the communication terminal divides 11A and 11B, and data communication between these communication terminal devices 11A and 11B will be controlled by the communication control terminal device 12. In this connection, the communication control terminal device 12 can be formed only of the wireless communication unit 16.

The wireless communication units 14A and 14B provided in the communication terminal devices 11A and 11B are comprised of transmitters 17A, 17B, receivers 18A, 18B, control units 19A, 19B, antennas 20A, 20B, and antenna switching units 21A, 21B respectively. Transmitters 17A and 17B, and receivers 18A, 18B are so constructed that these can perform the data communication via wireless circuits according to the OFDM system.

On the other hand, the wireless communication unit 16 provided in the communication control terminal device 12 is comprised of a transmitter 22, a receiver 23, a control unit 24, a resource information storage unit 25, an antenna 26 and an antenna switching unit 27. These transmitter 22 and receiver 23 are also constructed in order that these can conduct data communications via wireless circuits according to the OFDM system. Moreover, in the resource information storage unit 25, the resource information concerning the allocation time of data communication of the communication terminal devices 11A and 11B will be stored.

As described above, data communication will be conducted according to the OFDM system in this wireless LAN system 10. In this wireless LAN system 10, such as making 147455 symbols of OFDM (equivalent to 4 [ms]) as 1 frame, time division multiplexed data will be transmitted within this frame.

The M-sequence code for synchronization acquisition will be transmitted to the head of one frame from the wireless communication unit 16 of the communication control terminal device 12. This M-sequence code for synchronization acquisition will be received by the wireless communication units 14A and 14B of the communication terminal devices 11A and 11B respectively, the timing for data transmission/reception will be set relative to this received timing.

When the data communication request exists in the communication terminal device 11A, 11B, a transmission request will be transmitted from wireless communication unit 14A, 14B of the communication terminal device 11A, 11B to the wireless communication unit 16 of the communication control terminal device 12. In this wireless communication unit 16 of the communication control terminal device 12, transmission allocation time of each communication terminal device 11A, 11B will be determined based on the transmission request and the resource information, and the control information containing this transmission allocation time will be transmitted to the wireless communication unit 14A, 14B of communication terminal device 11A, 11B respectively from the wireless communication unit 16 of the communication control terminal device 12. In the wireless communication unit 14A, 14B of each communication terminal device 11A, 11B, data transmission/reception will be conducted according to this transmission allocation time. At this point, the data transmission/reception will be conducted relative to the M-sequence code for acquiring synchronization to be transmitted to the head of one frame.

(1-2) Wireless Communication Unit of Communication Control
Terminal Device

Figure 5:
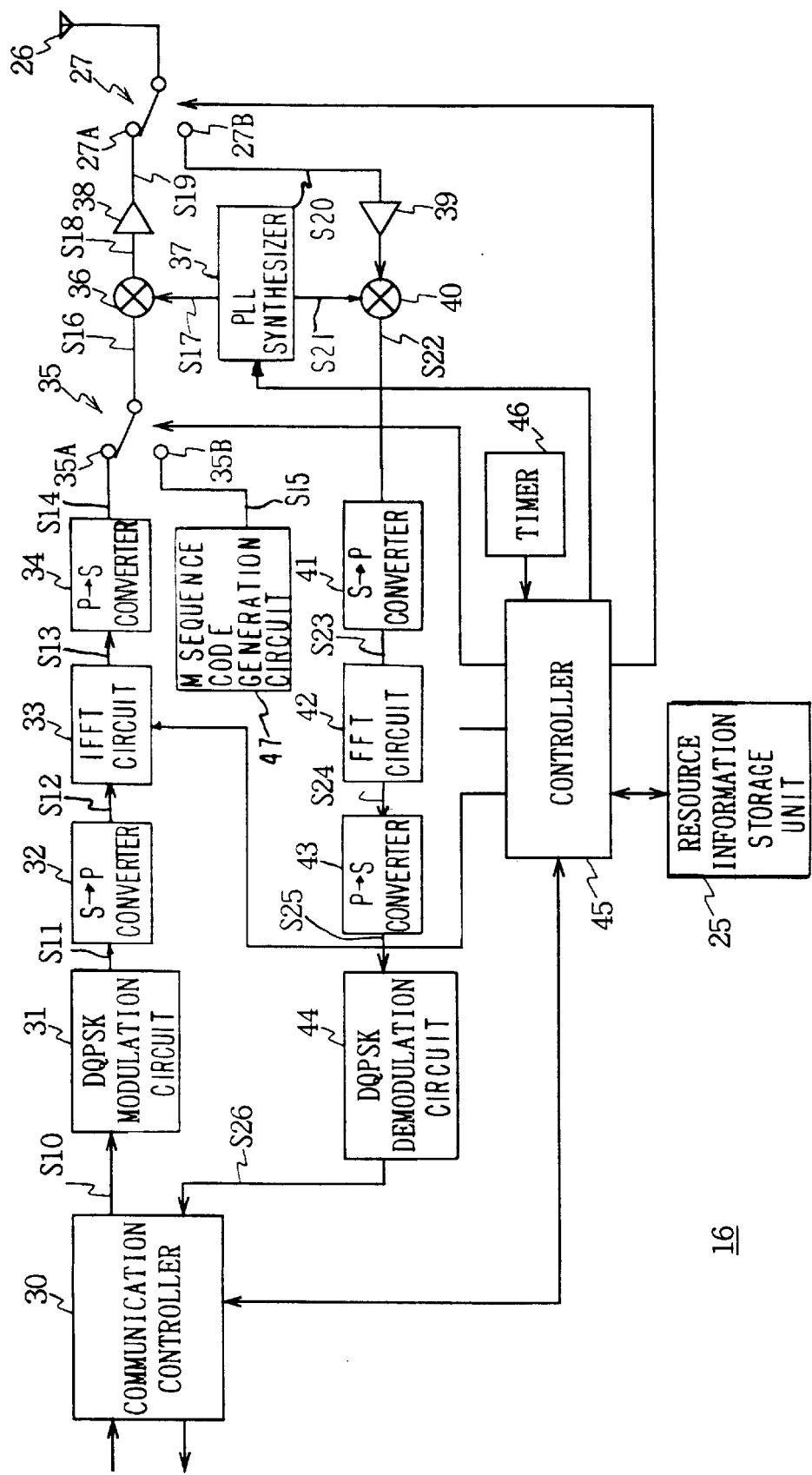
FIG. 5 is a block diagram showing the construction of a wireless communication unit provided in the communication control terminal device.

In this chapter the wireless communication unit 16 provided in the communication control terminal device 12 will be described referring to FIG. 5. As shown in FIG. 5, communication controller 30 is provided in the wireless communication unit 16 and data transmission can be conducted with the data terminal device 15 via this communication controller 30.

A transmission data S10 from the communication controller 30 will be supplied into DQPSK (differentially encoded quadrature phase shift keying) modulation circuit 31. The DQPSK modulation circuit 31 DQPSK modulates this transmission data S10 and outputs the resulting transmission signal S11 to the serial-parallel converter 32.

The serial-parallel converter 32 converts the transmission signal S11 to be supplied in a serial data sequence to the transmission signal S12 of a parallel data sequence and outputs this to the inverse fast Fourier transform circuit (IFFT) 33. The inverse fast Fourier transform circuit 33, applying the inverse Fourier transform to the transmission signal S12, maps the transmission signal S12 to the data in the frequency region and outputs the resulting transmission signal S13 to the parallel-serial conversion circuit 34. The parallel-serial conversion circuit 34 converts the transmission signal S13 to be supplied in a parallel data sequence to a serial data sequence and outputs the resulting transmission signal S14 to a shifting switch 35.

Here, the serial-parallel conversion circuit 32, the inverse fast Fourier transform circuit 33 and the parallel-serial conversion circuit 34 are circuits to convert the transmission signal S11 to multi-carrier signal according to the OFDM system. The OFDM system is the system that allocates the low bit rate signal to each sub-carrier using multiple sub-carriers, which are orthogonal to each other, making the frequency interval to be $f_0$ so that no interference occurs between codes and on the whole, high bit rate can be obtained according to this system.

Figure 6:
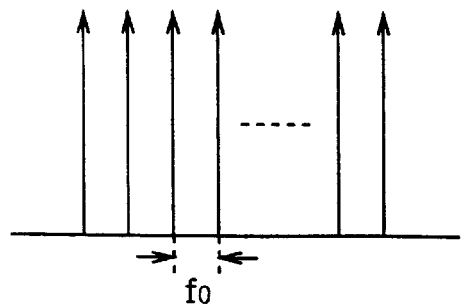
FIG. 6 is a brief linear diagram showing subcarrier of the OFDM system.

The spectrum of transmission waveform of this OFDM is shown in FIG. 6. As shown in FIG. 6, in this OFDM scheme, a transmission signal S11 will be allocated to sub-carriers placed orthogonal to each other, with frequency interval $f_0$ and said transmission signal S11 will be transmitted.

In this OFDM scheme, the transmission signal S11 is converted to parallel signal, and applying the inverse Fourier transform processing to this parallel converted transmission signal S12, said transmission signal S12 will be allocated to each subcarrier. On the other hand, when decoding, signal components of subcarrier per $f_0$ interval will be captured and data allocated to said subcarrier will be taken out by conducting the Fourier transform processing.

Figure 7:
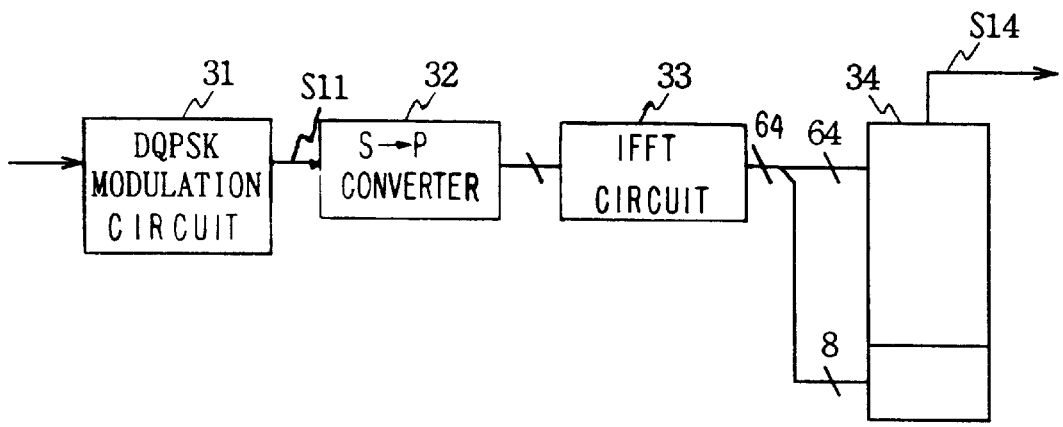
FIG. 7 is a simplified block diagram illustrating the signal processing of the OFDM system.

As shown in FIG. 7, in this example, 51 samples to be transmitted from the DQPSK modulation circuit 31 will be converted to the parallel data by the serial-parallel conversion circuit 32 and mapped onto the frequency region. The output of this serial-parallel conversion circuit 32 is applied the inverse Fourier transform processing by the inverse fast Fourier transform circuit 33 and effective symbol of 64 samples will be put out from said inverse fast Fourier transform circuit 33. Guard interval of 8 samples will be added to this effective symbol of 64 samples.

Figure 8:
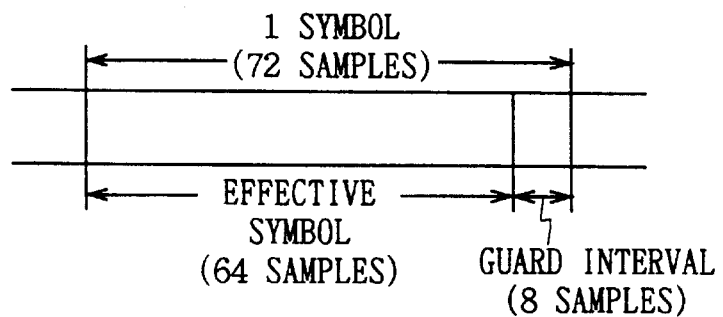
FIG. 8 is a brief linear diagram showing the symbol construction of the OFDM system.

Accordingly, in this example, as shown in FIG. 8, one symbol is made up of 72 samples, the effective symbol of 64-sample and the guard interval of 8-sample. The symbol interval $T_{symbol}$ is such as ($T_{symbol}$=1.953 [$\mu$s]), sample frequency $T_{sample}$ is such as ($T_{sample}$=27.127 [ns]), and the sample frequency $f_{sample}$ is such as ($f_{sample}$=36.864 [MHz]).

In this OFDM system, since the data is divided into multiple carriers and transmitted, the time per one symbol becomes longer. And since the guard interval is provided in time base, this system has an advantage not susceptible to effects of jitter and multipath. The guard interval is selected to approximately 10–20 percent of the effective symbol length.

More specifically, in the OFDM scheme, it is necessary to cut out the effective symbol length from a sequence of receiving signal and conduct the Fourier transform processing when demodulation is conducted. Even if errors exist when cutting out effective symbols due to the jitter, frequency components do not change and only the phase difference occurs due to the existence of guard interval. Accordingly, demodulation is possible by conducting the phase correction inserting the known pattern into signal or by counteracting the phase difference using differential coding. In the case of normal QPSK modulation, it is necessary to match the timing per each bit. However, in the case of the OFDM system, few bits difference causes degradation of only few dB in sensitivity, and demodulation is possible.

At this point, returning to FIG. 5 explanations will be continued. The transmission signal S14 to be transmitted from the parallel-serial conversion circuit 34 will be supplied to an input terminal 35A of the shifting switch 35. The M-sequence code S15 formed at the M-sequence code generation circuit 47 will be supplied to the other side input terminal 35B of the shifting switch 35.

In the case of transmitting the M-sequence code S15 as synchronizing signal, the switch 35 selects and outputs said M-sequence code S15, and in all other cases, it selects and outputs the transmission signal S14. An output signal S16 from the switch 35 will be supplied to the frequency conversion circuit 36. A local oscillation signal S17 is supplied to the frequency conversion circuit 36 from a PLL synthesizer 37. The frequency conversion circuit 36 forms a transmission signal S18 frequency converted to the fixed frequency by multiplying this local oscillation signal S17 by the output signal S16 and outputs this to a power amplifier 38. As the frequency to be used for this transmission signal S18, such as 2.4 [GHz], 5.7 [GHz] or 19 [GHz] band of quasi-microwave band can be considered.

The power amplifier 38 amplifies the transmission signal S18 to the prescribed power and supplied the resulting transmission signal S19 to an input terminal 27A of the switch forming the antenna switching unit 27. The antenna switcher 27 is a switch to shift the connection to the antenna 26 when transmitting signal and when receiving signal; at the time when transmitting data, it is shifted to the input terminal 27A side, while when receiving data, it is shifted to the terminal 27B. Thus, the transmission signal S19 is supplied to the antenna 26 via this switcher 27 and transmitted from said antenna 26.

On the other hand, a receive signal S20 received by the antenna 26 when receiving the data is supplied to a receiving amplifier 39 (generally called an LNA (low noise amplifier)) via the switcher 27 and after being amplified, it is supplied to a frequency conversion circuit 40.

This frequency conversion circuit 40, the local oscillation signal S21 from the PLL synthesizer 37 is supplied and the frequency conversion circuit 40 forms a receive signal S22 with medium frequency by multiplying this local oscillation signal S21 by the receive signal S20, and outputs this to the serial-parallel conversion circuit 41.

The serial-parallel conversion circuit 41 parallel converts the receive signal S22 and outputs the resulting receive signal S23 to the fast Fourier transform circuit 42 (FFT). The fast Fourier transform circuit 42 conducts the Fourier transform processing to the receive signal S23 and outputs the resulting receive signal S24 to the parallel-serial conversion circuit 43. The parallel-serial conversion circuit 43 converts the receive signal S24 to the receive signal S25 of serial data stream and outputs this to the DQPSK demodulation circuit 44.

Here, the serial-parallel conversion circuit 41, the fast Fourier transform circuit 42 and the parallel-serial conversion circuit 43 conduct the decoding of the OFDM scheme to the receive signal S22. More specifically, in the serial-parallel conversion circuit 41, effective data are cut out and receiving signal waveform will be captured in every $f_0$ intervals and converted to parallel data. Output of this serial-parallel conversion circuit 41 will be supplied to the fast Fourier transform circuit 42 and the Fourier transform processing will be executed. Thus, by conducting the Fourier transform processing to the waveforms sampled in every $f_0$ intervals, the OFDM scheme decoding will be conducted.

The DQPSK demodulation circuit 44, applying the DQPSK demodulation processing to the receive signal S25, restores receive data S26 and outputs this to the communication controller 30. The communication controller 30 outputs this receive data S26 to the data terminal device 15.

In this wireless communication unit 16, the whole operation will be controlled by the controller 45. The data transmission and data reception will be conducted based on the command from the controller 45, and the communication controller 30 conducts data delivery of transmission data S10 or receive data S26 between the data terminal device 15.

In this wireless LAN system, data will be transmitted by the TDMA scheme making one frame as a unit, and the M-sequence code for obtaining synchronization will be sent to one symbol of the head of one frame. In order to realize such control in the wireless communication unit 16 of the communication control terminal device 12, the M-sequence code generation circuit 36 and a memory comprising a resource information storage unit 25 and a timer 46 are provided. In this case, the switch 35 will be shifted to the input terminal 35B side a the timing of the head symbol of one frame and thus, the M-sequence code will be transmitted a the timing of the frame head.

When a transmission request is sent from the wireless communication unit 14A, 14B of communication terminal device 11A, 11B, this transmission request is received by the antenna 26 and OFDM demodulated by the fast Fourier transform circuit 42 and then DQPSK demodulated by the DQPSK demodulation circuit 44 and supplied to the communication controller 30. And the demodulated receive data showing the transmission request will be transmitted from the communication controller 30 to the controller 45.

The controller 45 is connected to the resource information storage unit 25. In this resource information storage unit 25, the resource information on the allocation time of each communication terminal device 11A, 11B to be transmitted per one frame is stored. The controller 45 determines the transmission allocation time of each communication terminal device 11A, 11B based on the received transmission request and communication resource residue. The control information to show this transmission allocation time will be sent from the controller 45 to the communication controller 30. The communication controller 30 supplies this control information as a transmission data S10 to the DQPSK modulation circuit 31 and thus, the modulation processing will be applied via the DQPSK modulation circuit 31 and the inverse fast Fourier transform circuit 33 and transmitted to the wireless communication unit 14A, 14B of each communication terminal device 11A, 11B from the antenna 26 as a transmission signal S19.

(1-3) Wireless Communication Unit of Communication Terminal Device

Figure 9:
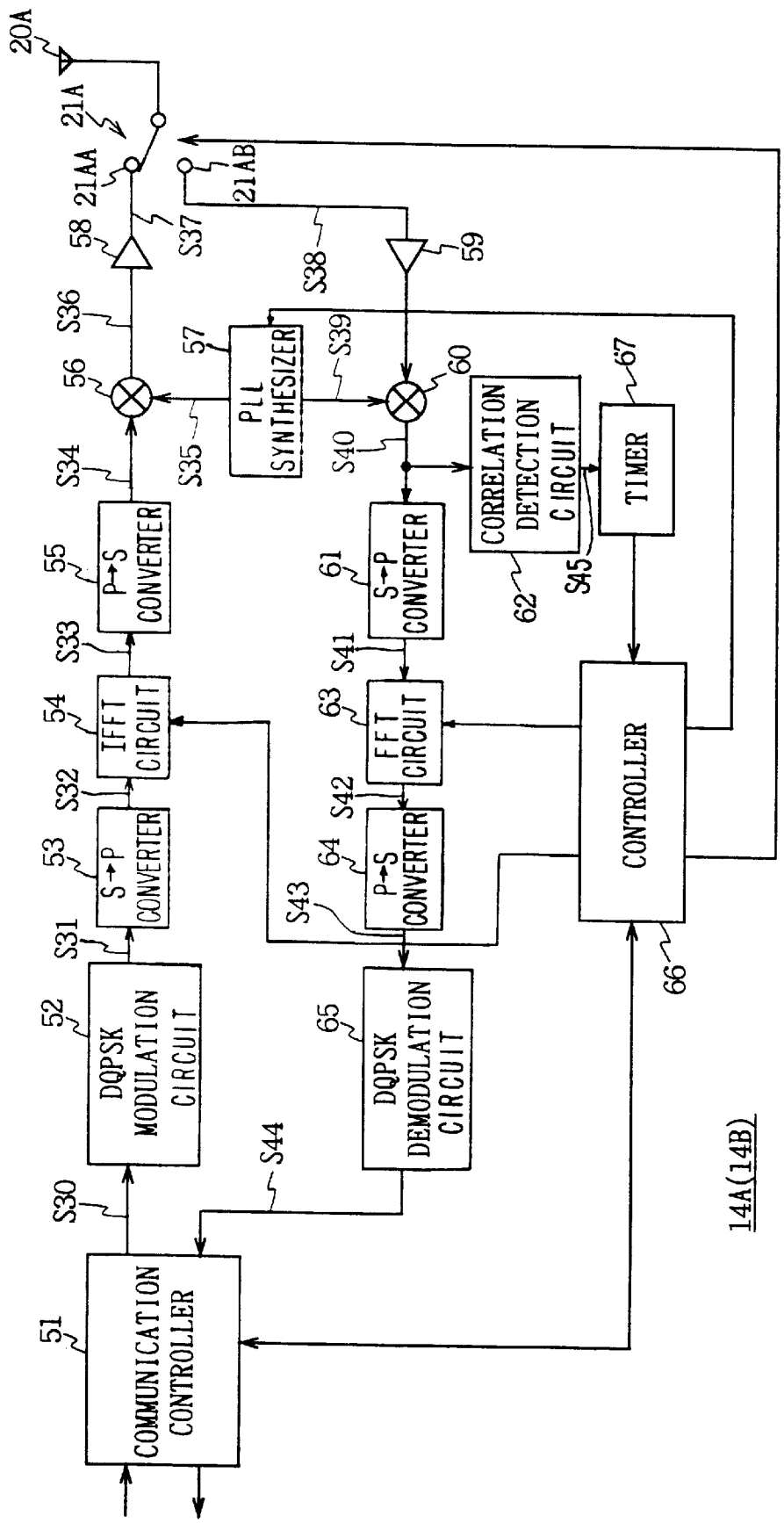
FIG. 9 is a block diagram showing the construction of a wireless communication unit provided in the communication terminal device.

Then, in this chapter the wireless communication units 14A and 14B provided respectively in the communication terminal devices 11A and 11B will be explained referring to FIG. 9. In this connection, since basically the wireless communication units 14A and 14B have the same construction, only the wireless communication unit 14A will be described in the following description. As shown in FIG. 9, in the wireless communication unit 14A, the transmission data S30 is entered via the communication controller 51. The transmission data sent out from the communication controller 51 is supplied into the DQPSK modulation circuit 52. The DQPSK modulation circuit 52 applies the DQPSK modulation to the transmission data S30 and outputs the resulting transmission signal S31 to the serial-parallel conversion circuit 53.

The serial-parallel conversion circuit 53 converts the transmission signal S31 of serial data stream to the transmission signal S32 of parallel data stream and outputs this to the inverse fast Fourier transform circuit 54. The inverse fast Fourier transform circuit 54, applying the inverse Fourier transform processing to the transmission signal S32, maps the transmission signal S32 to the data of frequency region and outputs the resultant transmission signal S33 to a parallel-serial conversion circuit 55. The parallel-serial conversion circuit 55 converts a transmission signal S33 supplied in parallel data stream to the serial data stream and supplies the resultant transmission signal S34 to the frequency conversion circuit 56. The serial-parallel conversion circuit 53, the inverse fast Fourier transform circuit 54 and the parallel-serial conversion circuit 55 convert the transmission signal S31 to multi-carrier signal using the OFDM scheme just as is the case with the wireless communication unit 16.

In the frequency conversion circuit 56, a local oscillation signal S35 is supplied from the PLL synthesizer 57, and the frequency conversion circuit 56, multiplying the transmission signal S34 by the local oscillation signal S35, forms a transmission signal S36, frequency converted to the prescribed frequency, and outputs this to a power amplifier 58.

The power amplifier 58 amplifies the transmission signal S36 to the prescribed power and supplies the resulting transmission signal S37 to the input terminal 21AA of the switch comprising the antenna switching unit 21A. This switch 21A shifts the connection to the antenna 20A when receiving data and when transmitting data. At the time when transmitting data, the switch 21A is shifted to the input terminal 21AA side, while at the time of data reception, it is shifted to the terminal 21AB side. Thus, the transmission signal S37 will be supplied to the antenna 20A via this switch 21A and transmitted from this antenna 20A.

On the other hand, the receive signal S38 received by the antenna 20A when receiving the data is supplied to the receiving amplifier 59 via the switch 21A and after being amplified, it is supplied to a frequency conversion circuit 60.

In the frequency conversion circuit 60, a local oscillation signal S39 from the PLL synthesizer 57 is supplied, and the frequency conversion circuit 60 forms a receive signal S40 of medium frequency by multiplying this local oscillation signal S39 by the receive signal S38 and outputs this to the serial-parallel conversion circuit 61 and the correlation detection circuit 62.

The serial-parallel conversion circuit 61 converts the receive signal S40 to parallel signal and outputs the resulting receive signal S41 to the fast Fourier transform circuit 63. The fast Fourier transform circuit 63 applies the Fourier transform processing to the receive signal S41 and outputs the resulting receive signal S42 to the parallel-serial conversion circuit 64. The parallel-serial conversion circuit 64 converts the receive signal S42 to receive signal S43 of serial data sequence and outputs this to the DQPSK demodulation circuit 65. At this point, the serial-parallel conversion circuit 61, the fast Fourier transform circuit 63 and the parallel-serial conversion circuit 64 conduct the OFDM scheme decoding to the receive signal S40 in the same manner as the wireless communication unit 16 described above.

The DQPSK demodulation circuit 65, applying the DQPSK demodulation processing to the receive signal S43, restores the receive data S44 and outputs this to the communication controller 51. The communication controller 51 sends this receive data S44 out to the data terminal device 13A.

Here, in this wireless communication unit 14A, the whole function will be controlled by the controller 66. The data transmission and data reception will be conducted by the command from the controller 66 and based on this control the communication controller 51 conducts the data delivery between transmission data S30 or the receive data S44 and the data terminal device 13A.

In this wireless LAN system 10, data will be transmitted by the TDMA scheme making one frame as a unit, and the M-sequence code for obtaining synchronization will be sent from the wireless communication unit 16 of the communication control terminal device 12 to one symbol of the head of one frame. In order to realize such control, this wireless communication unit 14A is equipped with a correlation detection circuit 62 and a timer 67. The M-sequence code to be transmitted from the wireless communication unit 16 of the communication control terminal device 12 will be received by the antenna 20A at the timing of the frame top and transmitted to the correlation detection circuit 62. The correlation detection circuit 62 detects the correlation between the code received and the pre-set code. And if it is judged that the correlation is very strong, a detection output S45 showing that the code having the correlation i.e., the M-sequence code has been received will be transmitted to the timer 67. The timer 67 conducts the time management making the timing at which this detection output S45 is given as the reference time.

In the case where there exist the data that the user wants to transmit, a transmission request will be sent from the communication controller 51 according to the command of the controller 66.

This transmission request is DQPSK modulated at the DQPSK modulation circuit 52 and OFDM converted at the inverse fast Fourier transform circuit 54 and transmitted from the antenna 20A to the communication control terminal device 12. This transmission request is received at the communication control terminal device 12 and the control information containing the transmission allocation time will be sent back from the communication control terminal device 12.

This control information will be received by the antenna 20A and OFDM demodulated at the fast Fourier transform circuit 63, and then will be DQPSK demodulated at the DQPSK demodulation circuit 65 and supplied to the communication controller 51. Then, the received data showing control information demodulated is supplied from the communication controller 51 to the controller 66.

This control information contains information regarding transmission times. These times are set with reference to the time of the timer 67. The timer 67, making the timing at which the detection output S45 was given from the correlation detection circuit 62 (i.e., the timing at which the M-sequence code was transmitted from the communication control terminal device 12) to be the reference time, controls the transmission time relative to this reference time and time information contained in the control information.

When the timer 67 judges that the transmission start time has come, the controller 66 outputs a transmission command of the transmission data to the communication controller 51. Receiving this command, the communication controller 51 starts the sendout of the transmission data S30. The transmission data S30 sent out is DQPSK modulated at the DQPSK modulation circuit 52 and conducted the OFDM conversion processing by the inverse fast Fourier transform circuit 54 and transmitted via the antenna 20A. Moreover, when the timer 67 judges that the reception time has come, the controller 66 sends out a reception start command to the fast Fourier transform circuit 63. Thus, the receive signal S38 received by the antenna 20A will be demodulated via the fast Fourier transform circuit 63.

With this arrangement, in this wireless LAN system 10, data are transmitted using multi-carrier according to the OFDM scheme. As described earlier, The OFDM wave is strong against jitter and the demodulation is possible even when few samples are slipped out. However, it cannot be demodulated if it further slips out and covers over 2 symbols. Accordingly, the timing should be set at a certain degree. In this wireless LAN system 10, making 147455 symbols (4 [ms]) to be one frame, for example, data will be transmitted in this frame by the TDMA scheme, and the M-sequence code will be provided in one symbol of the head of each frame, and using this M-sequence code, demodulation timing will be set.

If the received clock has 6.8 [ppm] delay with respect to the OFDM wave received, the time difference of 27.2 [ns] is accumulated between one frame of 4 [ms]. This is equivalent to 36.864 [MHz] sampling rate. Accordingly, if the clock having accuracy of approximately 6.8 [ppm] would be prepared, demodulation is possible without fail.

In this connection, as the symbol for synchronization, in addition to the M-sequence codes, preparing 2 kinds of M-sequence codes having the same frequency and adding these, the resultant code sequences, Gold code, Burker code or block code can be used.

(1–4) Construction of Correlation Detection Circuit

Figure 10:
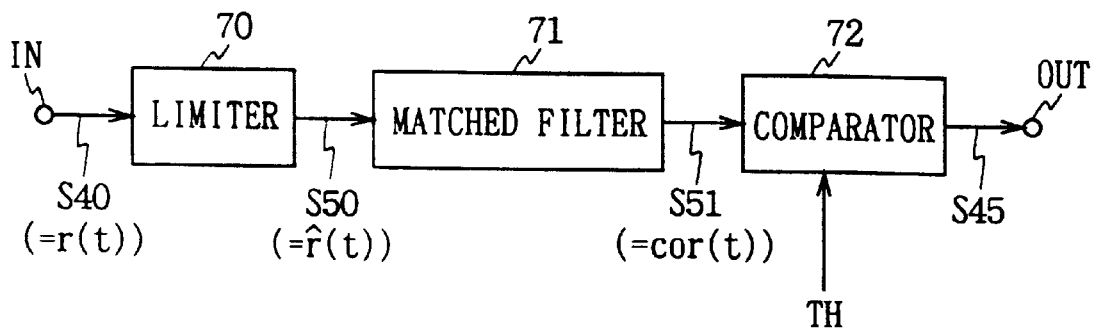
FIG. 10 is a block diagram showing the construction of a correlation detection circuit.

Next, in this chapter the correlation detection circuit 62 described above will be explained with reference to FIG. 10. As shown in FIG. 10, the correlation detection circuit 62 is roughly comprised of a limiter 70, a matched filter 71 and a comparator 72. At first, the receive signal S40 sent out from the frequency conversion circuit 60 is entered into the limiter 70 via the input terminal IN. The limiter 70 is a circuit that restricts the amplitude of the receive signal S40 to the fixed level according to plus/minus of the signal amplitude of the receive signal S10.

If assuming that the function of amplitude of the receive signal S40 is r(t), the limiter 70 regulates the amplitude of the receive signal S40 to the fixed level so that the amplitude value becomes "+1" or "−1" corresponding to plus/minus of the amplitude of the receive signal S40 and outputs the receive signal S50 whose amplitude is fixed to the prescribed level, as shown in the following equation:

$$\hat{r}(t) = \begin{cases} 1, & \text{if } r(t) > 0 \\ -1, & \text{if } r(t) \le 0 \end{cases} \quad (1)$$

Figure 1:
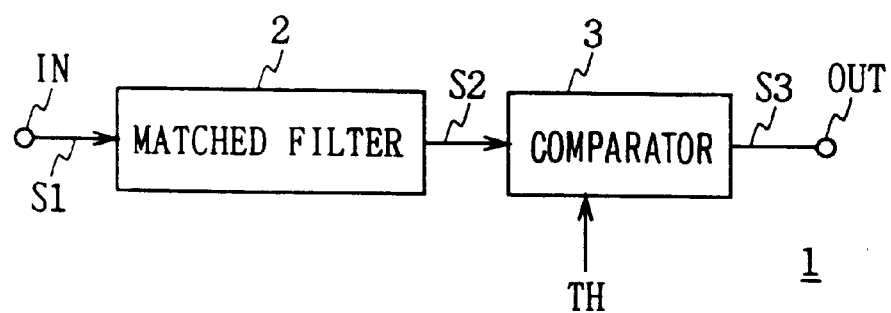
FIG. 1 is a block diagram showing the construction of the conventional correlation detection circuit.
Figure 2:
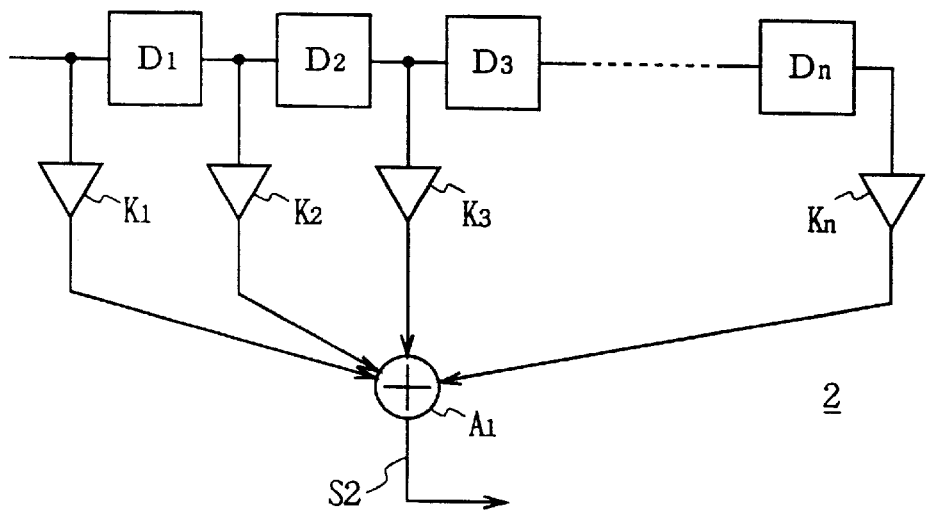
FIG. 2 is a block diagram showing the construction of a matched filter.
Figure 3A:
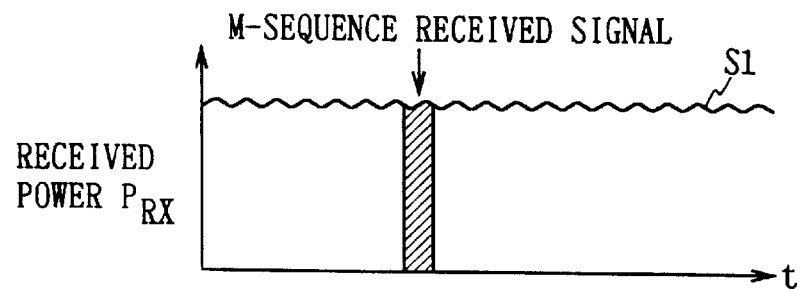
FIGS. 3A and 3B are brief linear diagrams illustrating degradation of the detection sensitivity of the correlation detection circuit affected by the AGC circuit.
Figure 3A:
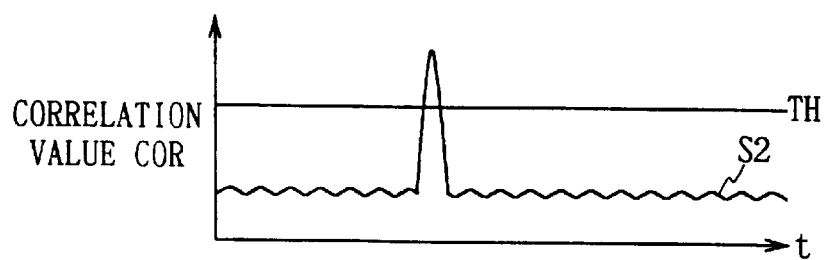
Figure 3B:
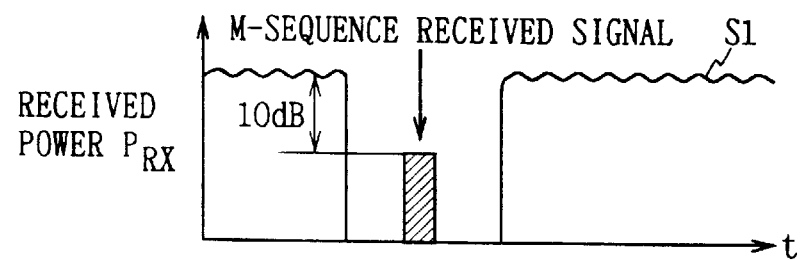
Figure 3B:

The matched filter 71 has nearly the same construction as that shown in FIG. 2, and this matched filter 71, multiplying the code sequence of receive signal S50 to be entered and the code sequence to be detected by the corresponding coefficient respectively and by adding the multiplication results, obtains a correlation value signal S51 and outputs this to the following comparator 72. The correlation value calculating processing in this matched filter 71 can be expressed using the amplitude function of the receive signal S50 and code sequence to be detected P(t) as follows:

$$cor(t) = \int_0^{TS} \hat{r}(t) P * (t - \tau) d\tau \quad (2)$$

Where r(t): Amplitude function of receive signal S50
P(t): Code sequence to be detected
cor(t): Correlation value signal S51 to be sent out The matched filter 71 outputs the correlation value cor(t) as shown in this EQUATION (2) as the correlation value signal S51.

The comparator 72 compares the signal level of this correlation value signal S51 with the signal level of threshold signal TH to be supplied from outside. And if the resultant shows that the signal level of correlation value signal S51 exceeds the signal level of threshold signal TH, the comparator 72 transmits a detection output S45 to show that the code sequence to be detected (i.e., M-sequence code) has been received to the timer 67 via the output terminal OUT.

In this connection, since the correlation value signal S51 to be sent out from the matched filter 71 is expressed as shown in EQUATION (2), this is proportional to the amplitude of receive signal to be entered. Accordingly, in general, the signal level of the output of this matched filter 71 becomes lower than the output of the conventional matched filter. Thus, the signal level of the threshold signal TH to be entered into the comparator 72 is set to the prescribed value lower than the conventional value.

Here, in the case where the receive signal S40 is the M-sequence code, it has correlation since the M-sequence code is the code sequence to be detected, and even if its amplitude is regulated to the fixed level by the limiter 70, and thus, the correlation value signal S51 having large signal level will be transmitted from the matched filter 71. Accordingly, since the signal level of the correlation value signal S51 is large, the detection output S45 showing that the signal level of correlation value signal S51 exceeds the threshold signal TH and the M-sequence code is detected in the comparator 72 will be transmitted.

On the other hand, in the case where the receive signal having large signal level, but this is not the M-sequence code in question, the amplitude of the receive signal S40 will be fixed to "+1" or "−1" and thus fixed signal received will be entered into the matched filter 71. Since the signal which is not the M-sequence code has no correlation to the coefficient set in the multiplier of the matched filter 71, the correlation value signal S51 having small level will be transmitted from the matched filter 71 even if coefficients were multiplied and the multiplication results were added. Accordingly, in the comparator 72, the signal level of the correlation value signal S51 does not exceed the signal level of the threshold signal TH and the detection output S45 would never be sent out.

Thus, in this correlation detection circuit 70, since the amplitude of the receive signal S40 is set to the fixed value, only M-sequence codes can be detected correctly. In this connection, the reason that the signal level of the correlation value signal S51 becomes small when the signal which is not the M-sequence code is received can be easily known by explaining the reason that the signal level of the correlation value signal became large when the signal which was not the M-sequence code was received as follows.

Generally, the signal processing in the matched filter, if the signal to be entered is taken as x(t) and the code sequence to be detected is taken as P(t), as is clear from EQUATION (2), can be expressed as follows:

$$cor(t) = \int_0^{TS} x(t) P * (t - \tau) d\tau \quad (3)$$

Where x(t) is input signal
P(t) is code sequence to be detected

At this point, if the input signal x(t)' whose signal level is 10 times larger than this input signal x(t) is entered, the correlation value signal to be sent out from the matched filter can be expressed as shown in the following EQUATION:

$$\begin{aligned} cor(t) &= \int_0^{TS} x(t)' P * (t - \tau) d\tau \\ &= \int_0^{TS} 10 x(t) P * (t - \tau) d\tau \\ &= 10 \int_0^{TS} x(t) P * (t - \tau) d\tau \end{aligned} \quad (4)$$

As shown above, the signal level of the correlation value signal becomes ten times larger. Accordingly, when the input signal having no correlation with the code sequence to be detected by the matched filter enters, if that input signal is extremely large, the correlation value signal with large signal level will be sent out even if they have no correlation.

To obviate such problems in this correlation detection circuit 62, the signal level of the receive signal S40 to be entered is set to the fixed constant level by the limiter 70 and even when the receive signal having large signal level but having no correlation enters, the misjudgement determining this as the code sequence to be detected can be prevented in advance.

At this point, signal waveforms of each unit at the time when correlations are detected by the correlation detection circuit 62 are shown in FIGS. 11A to 11E. FIGS. 11A and 11B show signal levels (shown by Input) of in-phase component (i.e., I component) and quadrature component (i.e., Q Component) of the receive signal S40, and signal levels (shown by Output) of the receive signal S50, that is the output of the limiter 70. FIG. 11C shows signal contents of the receive signal S40, and FIG. 11D shows the signal level of the correlation value signal S51, that is the output of the matched filter 71, and FIG. 11E shows the output of the matched filter of the conventional correlation detection circuit. As it is clear from the comparison between FIG. 11D and FIG. 11E, in the conventional case, if the signal level of the receive signal S40 is large, the signal level of the correlation value signal becomes large even it is not M-sequence code (expressed by "M-array" in FIG. 11C), and as a result, the misjudgment was made as to the M-sequence code was received. However, in the case of correlation detection circuit 62 according to the present invention, since the amplitude of the receive signal S40 is set to the constant level, the correlation value signal S51 whose signal level increases only by the M-sequence code to be detected can be obtained and thus, the reception of M-sequence code can be detected correctly.

(1–5) Communications Protocol

Figure 12:
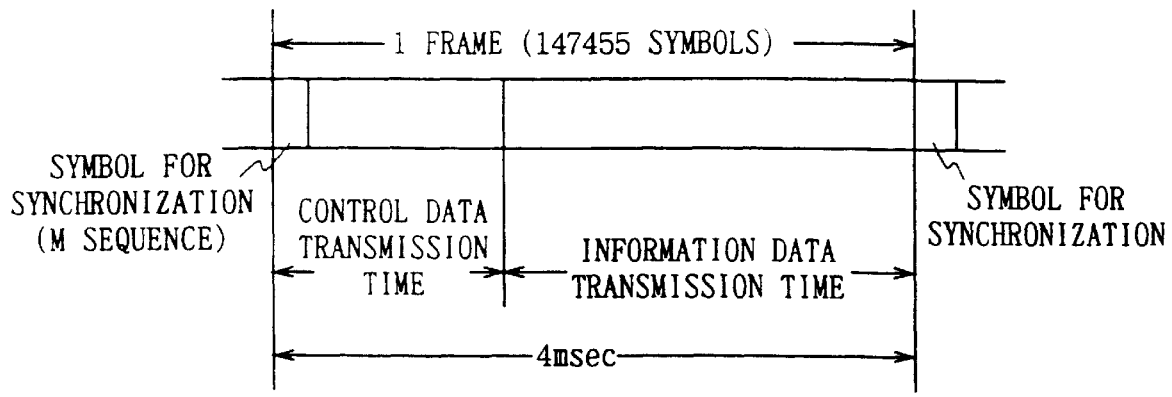
FIG. 12 is a brief linear diagram showing the construction of one frame.

Then next, the communications protocol of the wireless LAN system 10 will be described in the following paragraphs. First, the frame construction at the time of data communication according to this wireless LAN system 10 is shown in FIG. 12. As shown in FIG. 12, one frame is divided into the control data transmission time and the information data transmission time. In the control data transmission time, asynchronous data communication will be conducted, while in the information data transmission time, isochronous data communication will be conducted. When the symbol for synchronization is transmitted from the communication control terminal device 12, individual communication terminal device 11A, 11B sends the transmission request to the communication control terminal device 12 based on the receipt of this symbol for synchronization (i.e., M-sequence code). The communication control terminal device 12, responding to this transmission request, sends the control information including the transmission allocation time to individual communication terminal device 11A, 11B. The transmission of the control information is carried out according to the asynchronous communication in the control data transmission time. In the case where the data communication is carried out between the communication terminal devices 11A and 11B, the communication terminal devices 11A and 11B perform the data communication according to this transmission allocation time. The data communications between the communication terminal devices 11A and 11B will be carried out isochronously using the information data transmission time.

The data communication to be carried out in the information data transmission time can be conducted in the asynchronous manner and also asynchronous communications and isochronous communications can be coexisted.

Figure 13:
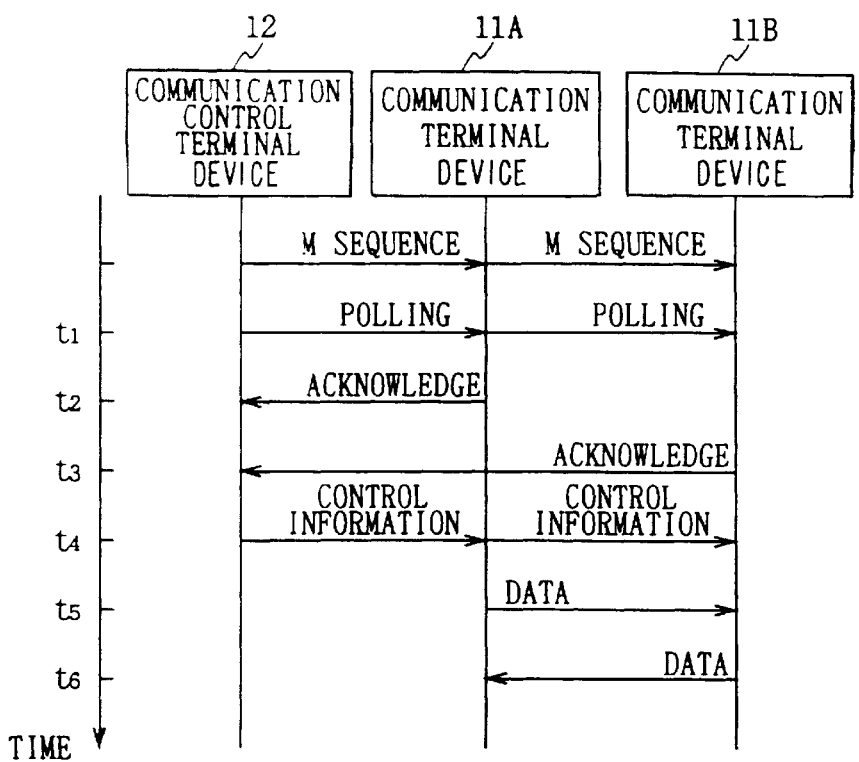
FIG. 13 is a sequence chart showing the communication sequence.

At this point, the communication sequence in the case of conducting the data communication between the communication terminal device 11A and the communication terminal device 11B will be shown in FIG. 13, and the data contents of the TDMA communication to be conducted in one frame at that time will be shown in FIG. 14.

As shown in FIG. 13, in one symbol at the head of one frame, M-sequence code is transmitted toward each communication terminal device 11A, 11B from the communication control terminal device 12. This M-sequence code is received at the wireless communication units 14A and 14B of each communication terminal device 11A and 11B respectively, and timer 67 to conduct the time management will be set based on the timing at which this M-sequence code is received.

Then, at the time point $t_1$, the communication control terminal device 12 calls out the communication terminal devices 11A and 11B by the polling processing. The communication terminal device 11A, upon receiving this, at the time point $t_2$, sends an acknowledge signal, that is an answer signal. Moreover, the communication terminal device 11B replies sending an acknowledge signal at the time point $t_3$, the time point delayed from the time point $t_2$. At this point, if the transmission is requested, this acknowledge signal includes the transmission request. At this point, supposing that the communication terminal device 11A sends a transmission request showing the transfer of data to the communication terminal device 11B, and the communication terminal device 11B sends a transmission request showing the transfer of data to the communication terminal device 11B.

The communication control terminal device 12 determines the transmission allocation time based on these transmission requests, and at the time point $t_4$, control information is transmitted to the communication terminal devices 11A and 11B. Here, supposing that the transmission start time of the communication terminal device 11A is decided to be the time point $t_5$ and the transmission start time of the communication terminal device 11B is determined to be the time point $t_6$.

The communication terminal device 11A, upon receiving the control information including the transmission allocation time, starts data transmission to the communication terminal device 11B at the time point $t_5$. Similarly, the communication terminal device 11B, receiving the control information, when the data transmission from the communication terminal device 11A is terminated, starts the data transmission to the communication terminal device 11A at the following time point $t_6$. In this connection, the timing judgment of the time point $t_5$ and $t_6$ in the communication terminal devices 11A and 11B are conducted by the timer 67 which operated making the timing at which the M-sequence code is received as the reference time.

When the above operations have been conducted, data as shown in FIG. 14 will be sent in one frame. More specifically, as shown in FIG. 14, the M-sequence code is sent to the head of one frame, each communication terminal device 11A, 11B is called out at the time point $t_1$, and at the time points $t_2$ and $t_3$, acknowledge signals to the callouts are returned, the control information including the transmission allocation time is sent at the time point $t_4$, and data transmission from the communication terminal device 11A to the communication terminal device 11B is started from the time point $5_5$, and the data transmission from the communication terminal device 11B to the communication terminal device 11A is started from the time point $t_6$.

Accordingly, since the OFDM scheme is used in this wireless LAN system, it is possible to realize high speed data rate. Data will be transmitted according to the TDMA making one frame as a unit, the M-sequence code will be sent at the head of one frame and the transmission/reception timing will be set with reference to this M-sequence code.

The transmission/reception time of each communication terminal device 11A, 11B will be assigned by the control information from the communication control terminal device 12. And since the timer 67 of each communication terminal device 11A, 11B is set relative to the M-sequence code at the top of one frame, the timers 67 of individual communication terminal device 11A and 11B are set equally. Accordingly, when receiving, data can be reproduced demodulating only required symbols in the frame. Moreover, data can be multiplexed within the same frame from multiple communication terminal devices 11A, 11B, and data can be demodulated at the same demodulation timing even when jitter exists.

In this connection, even if a small difference exists between the timer of the transmitting end and the timer of the receiving end, data can be demodulated without fail because of the characteristic of OFDM. Accordingly, it is unnecessary to obtain synchronization prior to receiving signal per burst and it is not necessary to provide bit for synchronization per each burst. Accordingly, bits in the frame can be effectively utilized.

(1-6) Operation and Effects

According to the foregoing construction, in this wireless LAN system 10, the M-sequence code is transmitted from the communication control terminal device 12 at the head of frame, and this M-sequence code is received at the communication terminal devices 11A and 11B, and the time management will be conducted relative to the timing at which this M-sequence code is received. The judgment whether this M-sequence code has been received or not will be conducted by the correlation detection circuit 62.

In the correlation detection circuit 62, firstly, the limiter 70 regulates the amplitude of the receive signal S40 to the constant level, and enters the resultant receive signal S50 into the matched filter 71. In the matched filter 71, the code sequence received will be multiplied by the coefficient corresponding to the M-sequence code to be detected and adding up the multiplication results, the correlation value signal S51 will be sent out. Thus, by comparing the signal level of this correlation value signal S51 with the threshold TH in the comparator 72, whether the M-sequence code is received or not will be determined. In this case, since the amplitude of the receive signal S40 is fixed either to "+1" or "−1", the correlation value signal S51 whose signal level increases only when the M-sequence code is received can be obtained, and thus, whether the M-sequence code has been received or not can be certainly judged based on this correlation value signal S51.

Furthermore, in this case, if there exists a receive signal having large signal level immediately before receiving the M-sequence code and the operation to decrease the gain to the M-sequence code is generated by the AGC circuit, since the amplitude is set to the fixed level by the limiter 70, the gain decrease by the AGC circuit has no effects at all.

Instead of regulating the amplitude of the receive signal S40 to the fixed level, the method to calculate the average amplitude of the receive signal S40 and to normalize the correlation value signal to be transmitted from the matched filter 71 using this average amplitude can be considered. However, in the case of this method, when the receive signal having extremely large signal level is received, there is a possibility of overflow occurrence in the average amplitude calculation circuit and the divider to perform the normalization processing and the M-sequence code cannot be detected. Moreover, according to this method, since it is necessary to provide the average amplitude calculation circuit and the divider, the circuit construction becomes very complicated and as a result, there is a fear that the correlation detection circuit cannot be mini-sized.

On the other hand, the correlation detection circuit 62 according to the present invention, since the amplitude of the receive signal S40 is fixed to "+1" or "−1" by the limiter 70, the circuit would not cause overflow and the M-sequence code can be certainly detected. Moreover, since it is not necessary to provide the average amplitude calculation circuit and the divider circuit formed of integrators, the correlation detection circuit can be constructed with a simple construction.

According to the foregoing construction, since the amplitude of the receive signal S40 is regulated to the fixed level, and inputting that amplitude fixed receive signal S50 to the matched filter 71, the correlation value signal S51 is detected and comparing this correlation value signal S51 with the threshold TH, whether the code sequence to be detected has been received or not will be determined, the detection error according to the signal level of the receive signal S40 can be can be prevented in advance, and the code sequence to be detected can be detected certainly with a simple construction.

(2) Other Embodiments

Figure 15:
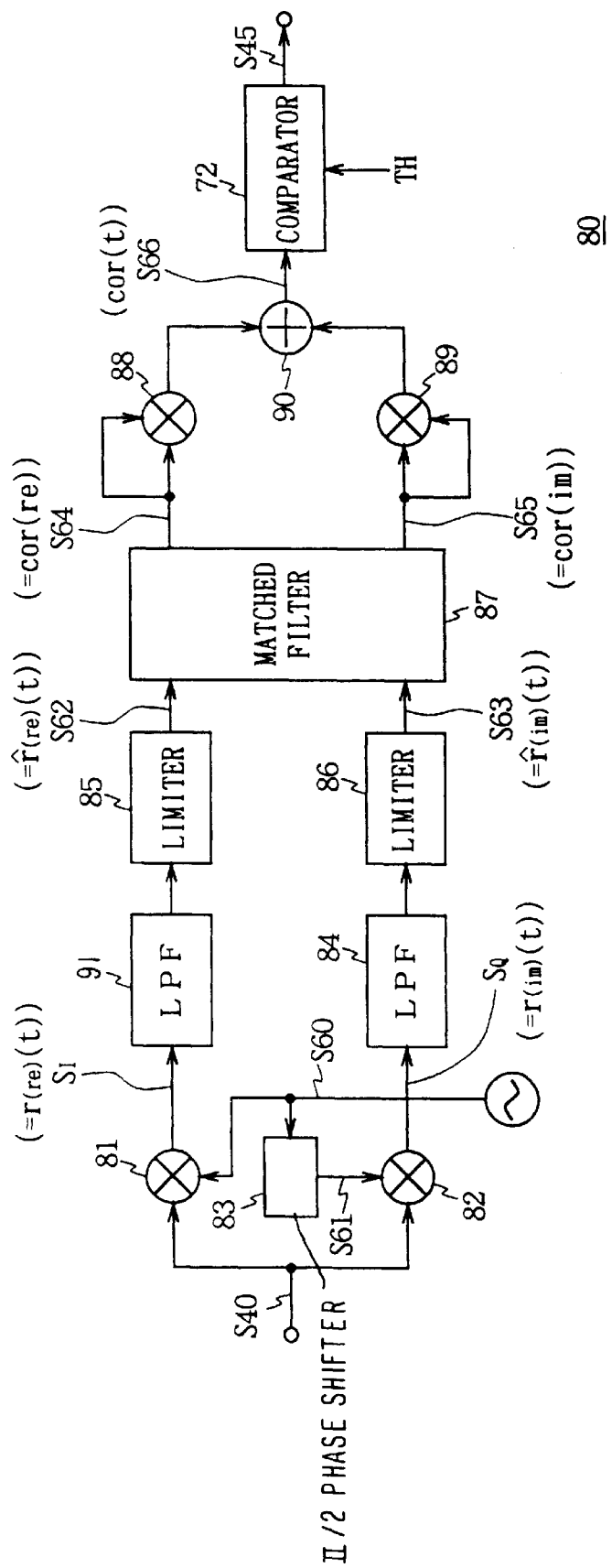
FIG. 15 is a block diagram showing the construction of the correlation detection circuit according to another embodiment.

The embodiment described above has dealt with the case of detecting the correlation value signal S51 from the receive signal S40. However, the present invention is not only limited to this but also in-phase components (i.e., I components) and quadrature components (i.e., Q components) may be extracted from the receive signal S40 and correlation value signal may be detected per each component. Examples of this case will be described referring to FIGS. 15 and 16. As shown in FIG. 15, in the correlation detection circuit 80, receive signal S40 is entered firstly into the first and the second multipliers 81 and 82. Local oscillation signal S60 is entered in this multiplier 81, and in the multiplier 82, a local oscillation signal S61, in which the phase of the local oscillation signal S60 is delayed for π/2 by a phase shifter 83. The multiplier 81, multiplying the receive signal S40 to be entered by the local oscillation signal S60, extracts in-phase component $S_I$ of the base-band signal. Moreover, the multiplier 82 extracts quadrature component $S_Q$ of the base-band signal by multiplying the receive signal S40 to be entered by the local oscillation signal S61.

These in-phase component $S_I$ and quadrature component $S_Q$ extracted, after unnecessary components are eliminated, will be entered into limiters 85 and 86 via low-pass filters 91 and 84 respectively. The limiters 85 and 86 have the same construction as the limiter 70 shown in FIG. 10, and these limiters regulate amplitudes of the in-phase component $S_I$ and quadrature component $S_Q$ to be entered to the fixed level "+1" or "−1" corresponding to the plus or minus of said amplitudes, and output the resultant in-phase component S62 and quadrature component S63 to the matched filter 87. The matched filter 87 detects correlation value signals S64 and S65 per each component and transmits these to the multipliers 88 and 89 respectively.

With this arrangement, after these correlation value signals S64 and S65 are being squared by the multipliers 88 and 89, a correlation value signal S66 can be obtained adding in-phase components and quadrature components by the adder 90. And this correlation value signal S66 is entered into the comparator 72 and by comparing this with the threshold TH, whether the M-sequence code to be detected has been received or not can be judged.

Accordingly, if in-phase components and quadrature components are extracted from the receive signal 40 by using signal extracting means (81–83), correlation value signals S64 and S65 are detected per each component and the correlation value signal S66 would be detected by adding these, the code sequence to be detected can be correctly detected from the receive signal in which phase modulation such as QPSK modulation is conducted.

In this case the correlation value signal S66 to be detected can be expressed as shown in the following equation:

$$cor(t) = |\sum_i \hat{r}_{(re)}(i)P*(i-j)|^2 + |\sum_i \hat{r}_{(im)}(i)P*(i-j)|^2 \quad (5)$$

Figure 16:
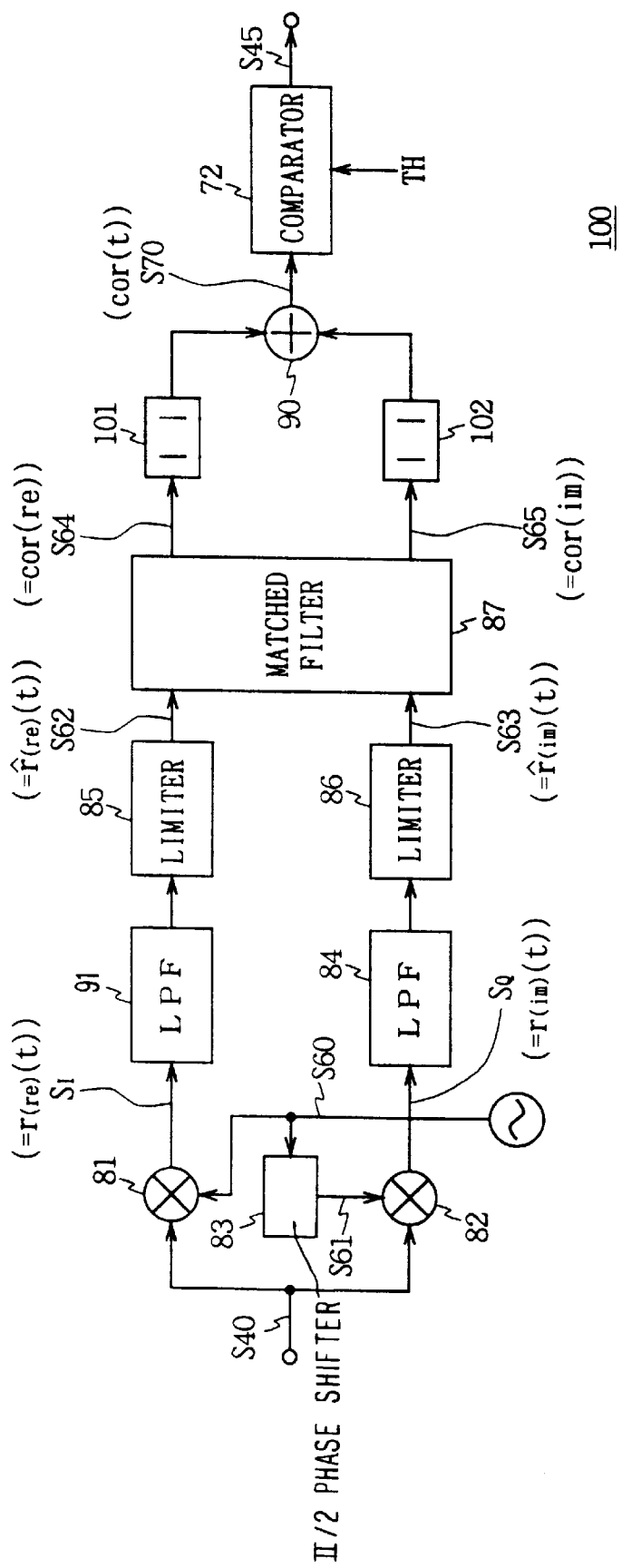
FIG. 16 is a block diagram showing the construction of the correlation detection circuit according to another embodiment.

Furthermore, in FIG. 16, in which the corresponding parts of FIG. 15 are given the same reference numerals, absolute value circuits 101 and 102 are provided in the correlation detection circuit 100 in stead of multipliers 88 and 89, and the absolute values of correlation value signals S64 and S65 detected per each component are obtained and adding up these, in-phase components and quadrature components combined correlation value signal S70 may be detected. With this arrangement, since the circuit construction is simpler in the case of obtaining the absolute value rather than obtaining the value squared, a correlation detection circuit 100 capable of detecting the code sequence to be detected correctly and with the simpler construction is realized.

The correlation value signal S70 to be detected in this case can be expressed as follows:

$$cor(t) = |\sum_i \hat{r}_{(re)}(i)P*(i-j)| + |\sum_i \hat{r}_{(im)}(i)P*(i-j)| \quad (6)$$

Moreover, the embodiment described above has dealt with the case of setting the amplitude of the receive signal S40 to the fixed level "+1" or "−1". However, the present invention is not only limited to this but also the amplitude may be set to the fixed level "+0.5" or "−0.5". Anyway, if the signal level of the receive signal S40 can be set to the fixed level within the range that can be set to the uniform level, the other value may be used.

Figure 17:
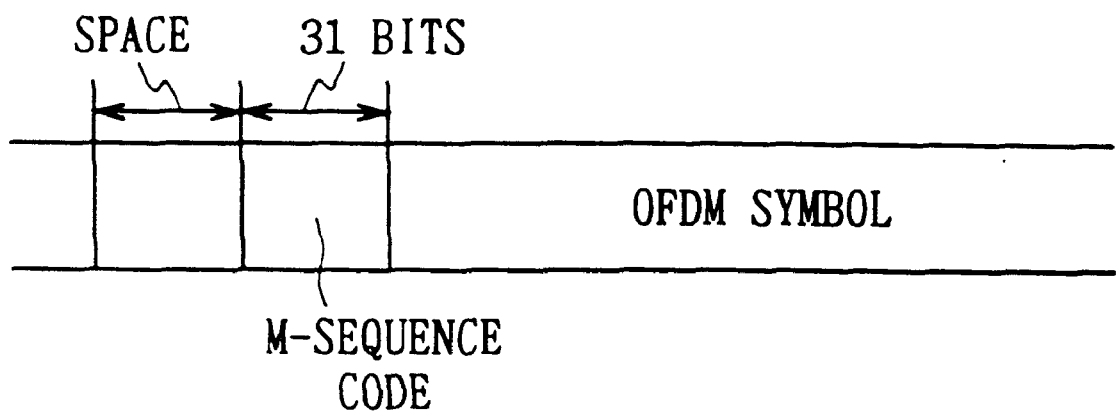
FIG. 17 is a brief linear diagram illustrating the transmission method of M-sequence code according to another embodiment.

Furthermore, the embodiment described above has dealt with the case of transmitting the M-sequence code corresponding to one symbol of OFDM to the head of one frame. However, the present invention is not only limited to this but also as the symbol for synchronization, other than one symbol may do. Anyway, as the length of this symbol for synchronization, variable length may be acceptable. For example, as shown in FIG. 17, making the length of M-sequence code to 31-bit, shorter than 1 symbol, and a space may be provided at the head of one frame, or as the length of M-sequence code, the length longer than one symbol may be used. Moreover, the M-sequence code for frame synchronization is not necessarily placed at the head of the frame but the M-sequence code may be placed at various places in the frame.

Figure 18:
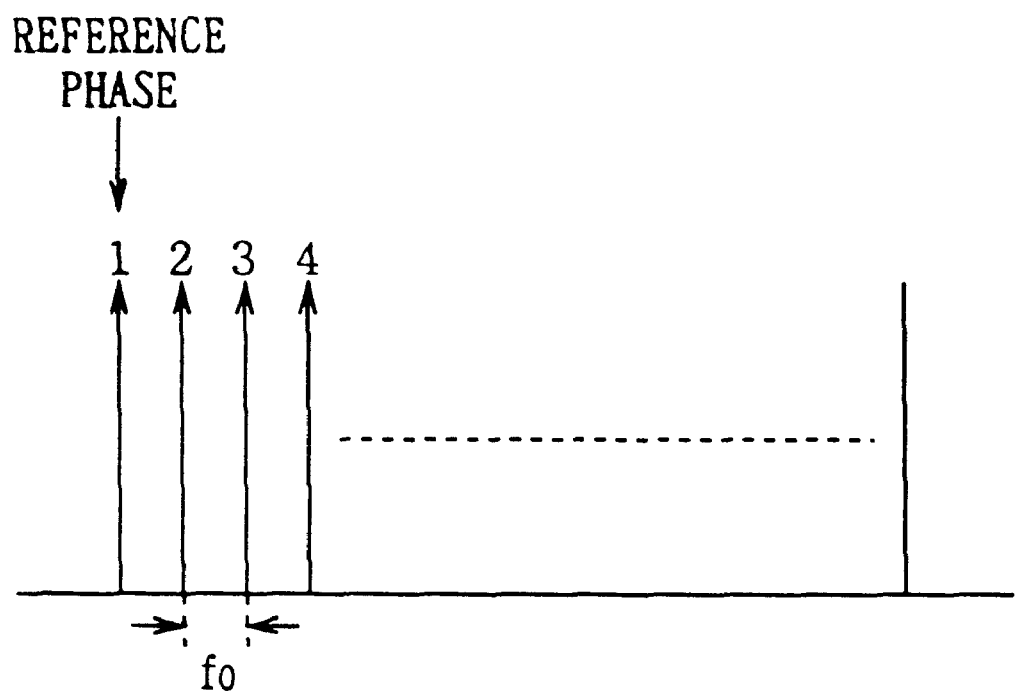
FIG. 18 is a brief linear diagram illustrating the method to allocate the reference phase to subcarriers.

Furthermore, as shown in FIG. 18, information may be placed on the phase difference between subcarriers. More specifically, in the DQPSK modulation, the direction of frequency is changed. If the sampling timing delays when receiving the signal, the phase of QPSK wave of each subcarrier after being Fourier transformed is reversed at the time when OFDM demodulating. As a method to obtain the correct QPSK phase, the method, allocating the known phase signal to the part of OFDM subcarrier as the pilot signal and to form the reference phase may be applied. An example shown in FIG. 18, information is placed in the phase difference between subcarriers relative to the first carrier. Thus, even if the phase reverses, the amount of rotation is small and little error exists. Since in the example shown by FIG. 18, the first carrier is assigned as the carrier to give the reference phase, the other carrier may be assigned as the reference.

Furthermore, the embodiment described above has dealt with the case of DQPSK modulating the data and transmitting the data via multicarriers by the OFDM. However, the present invention is not only limited to this but also the multilevel modulation QAM (quadrature amplitude modulation) may be used. As the QAM, such as 16-QAM, 21-QAM, 128-QAM and 256-QAM can be used. Moreover, Trellis-coded modulation can be also used as the coding.

Moreover, the embodiment described above has dealt with the case of providing the M-sequence generation circuit 47 in the wireless communication unit 16 of the communication control terminal device 12 and the correlation detection circuit 62 in the wireless communication units 14A and 14B of the communication terminal devices 11A and 11B. However, the present invention is not only limited to this but also the M-sequence generation circuit and correlation detection circuit are provided in one terminal device and it may be constructed so that the M-sequence generation circuit and the correlation detection circuit can be shifted and used depending upon whether these would be used as the communication control terminal device or the communication terminal device.

According to the present invention as described above, since the input signal is entered to the matched filter means after the amplitude of this input signal is regulated to the fixed value, the accidental output of the correlation value having large signal level by the matched filter means even though it is not the code sequence to be detected, can be prevented and only the code sequence to be detected can be correctly detected. And thereby, a correlation detection device capable of detecting the prescribed code sequence from the input signal correctly and with a simple construction can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A correlation detection device for detecting a code sequence from an input signal using correlation, comprising:

limiter means for regulating an amplitude of said input signal to a prescribed constant value according to a plus/minus value of said input signal;

matched filter means for outputting a correlation value signal upon detecting the correlation between an output signal supplied from said limiter means and said code sequence to be detected; and comparison means for judging whether said input signal is the code sequence to be detected by comparing a signal level of said correlation value signal with a prescribed threshold.

2. A correlation detection device for detecting a code sequence from an input signal using correlation, comprising:

signal extracting means for extracting in-phase components and quadrature components from said input signal;

first limiter means for regulating an amplitude of said in-phase components to a first prescribed constant value;

second limiter means for regulating an amplitude of said quadrature components to a second prescribed constant value;

matched filter means for detecting the correlation between an output signal transmitted from said first and second limiter means and the code sequence to be detected for each in-phase and quadrature component and for outputting first and the second correlation value signals;

first multiplication means for squaring said first correlation value signal;

second multiplication means for squaring said second correlation value signal;

adding means for outputting a third correlation value signal by adding output signals of said first and second multiplication means; and comparison means for judging whether some input signal is the code sequence to be detected by comparing a signal level of said third correlation value with a prescribed threshold.

3. A correlation detection device for detecting a code sequence from an input signal using correlation, comprising:

signal extracting means for extracting in-phase components and quadrature components from said input signal;

first limiter means for regulating an amplitude of said in-phase components to a first prescribed constant value;

second limiter means for regulating an amplitude of said quadrature components to a second prescribed constant value;

matched filter means for detecting the correlation between an output signal sent out from said first and second limiter means and said code sequence to be detected for each in-phase and quadrature component and for outputting first and second correlation value signals;

first absolute value means for calculating an absolute value of said first correlation value signal;

second absolute value means for calculating an absolute value of said second correlation value signal;

adding means for outputting a third correlation value signal by adding output signals of said first and second absolute value means; and comparison means for judging whether said input signal is the code sequence to be detected by comparing a signal level of said third correlation value signal with a prescribed threshold.

4. A correlation detection method for detecting a code sequence from an input signal using correlation, comprising the steps of:

regulating an amplitude of said input signal to a prescribed constant value according to a plus/minus value of said input signal;

detecting a correlation value between the input signal, of which the amplitude is fixed to the prescribed constant value, and the code sequence to be detected; and judging whether said input signal is the code sequence to be detected by comparing a signal level of said correlation value with a prescribed threshold.

5. The correlation detection method according to claim 4, further comprising the steps of:

extracting in-phase components and quadrature components from said input signal; and combining correlation values calculated for each in-phase and quadrature component and comparing a result of the combining and said threshold.

6. The correlation detection method according to claim 5, further comprising the step of sequencing and combining, in the case of combining correlation values calculated for each in-phase and quadrature component, each correlation value.

7. The correlation detection method according to claim 5, further comprising the step of, obtaining and combining, in the case of combining the correlation values calculated for each in-phase and quadrature component, the absolute value of each correlation value.

8. A communication terminal device for generating a transmission symbol sequence by performing a prescribed modulation processing based on data to be transmitted, and transmitting and receiving a transmission signal generated by performing a prescribed transmission processing on the transmission symbol sequence, said communication terminal device comprising:

receiving means for receiving said transmission signal as a receive signal;

demodulating means for performing a prescribed demodulation processing on said receive signal;

correlation detecting means, including:
    limiter means for regulating an amplitude of an input signal to a prescribed constant value according to a plus/minus value of said input signal;
    matched filter means for outputting a correlation value signal upon detecting a correlation between an output signal supplied from said limiter means and a code sequence to be detected; and
    comparison means for judging whether said input signal is the code sequence to be detected by comparing a signal level of said correlation value signal with a prescribed threshold; and control means for controlling said modulation processing and said demodulation processing with a timing when said correlation detecting means judges said input signal is the code sequence to be detected.

9. A communication terminal device for generating a transmission symbol sequence by performing a prescribed modulation processing based on data to be transmitted, and transmitting and receiving a transmission signal generated by performing a prescribed transmission processing on the transmission symbol sequence, said communication terminal device comprising:

receiving means for receiving said transmission signal as a receive signal;

demodulating means for performing a prescribed demodulation processing on said receive signal;

correlation detecting means, including:
    signal extracting means for extracting in-phase components and quadrature components from an input signal;
    first limiter means for regulating an amplitude of said in-phase components to a first prescribed constant value;
    second limiter means for regulating an amplitude of said quadrature components to a second prescribed constant value;
    matched filter means for detecting a correlation between an output signal to be transmitted from said first and second limiter means and a code sequence to be detected for each in-phase and quadrature component and for outputting first and the second correlation value signals;
    first multiplication means for squaring said first correlation value signal;

second multiplication means for squaring said second correlation value signal;

adding means for outputting a third correlation value signal by adding output signals of said first and second multiplication means; and comparison means for judging whether said input signal is the code sequence to be detected by comparing a signal level of said third correlation value signal with a prescribed threshold; and control means for controlling said modulation processing and said demodulation processing with a timing when said correlation detecting means judges said input signal is the code sequence to be detected.

10. A communication terminal device for generating a transmission symbol sequence by performing a prescribed modulation processing based on data to be transmitted, and transmitting and receiving a transmission signal generated by performing a prescribed transmission processing on the transmission symbol sequence, said communication terminal device comprising:

receiving means for receiving said transmission signal as a receive signal;

demodulating means for performing a prescribed demodulation processing on said receive signal;

correlation detecting means, including:

signal extracting means for extracting in-phase components and quadrature components from an input signal;

first limiter means for regulating an amplitude of said in-phase components to a first prescribed constant value;

second limiter means for regulating an amplitude of said quadrature components to a second prescribed constant value;

matched filter means for detecting a correlation between an output signal to be sent out from said first and second limiter means and a code sequence to be detected for each in-phase and quadrature component and for outputting first and second correlation value signals;

first absolute value means for calculating an absolute value of said first correlation value signal;

second absolute value means for calculating an absolute value of said second correlation value signal;

adding means for outputting a third correlation value signal by adding output signals of said first and second absolute value means; and comparison means for judging whether said input signal is the code sequence to be detected by comparing a signal level of said third correlation value signal with a prescribed threshold; and control means for controlling said modulation processing and said demodulation processing with a timing when said correlation detecting means judges said input signal is the code sequence to be detected.

* * * * *